(12) United States Patent
Zhang

(10) Patent No.: US 10,353,139 B2
(45) Date of Patent: Jul. 16, 2019

(54) BACKLIGHT MODULE AND DISPLAY DEVICE

(71) Applicant: WUHAN CHINA STAR OPTOELECTRONICS TECHNOLOGY CO., LTD, Wuhan, Hubei (CN)

(72) Inventor: Zhenzhen Zhang, Hubei (CN)

(73) Assignee: Wuhan China Star Optoelectronics Technology Co., Ltd., Wuhan, Hubei (CN)

( * ) Notice: Subject to any disclaimer, the term of this patent is extended or adjusted under 35 U.S.C. 154(b) by 0 days.

(21) Appl. No.: 15/576,620

(22) PCT Filed: Sep. 1, 2017

(86) PCT No.: PCT/CN2017/100261
§ 371 (c)(1),
(2) Date: Nov. 22, 2017

(87) PCT Pub. No.: WO2019/000637
PCT Pub. Date: Jan. 3, 2019

(65) Prior Publication Data
US 2019/0004242 A1      Jan. 3, 2019

(30) Foreign Application Priority Data

Jun. 30, 2017   (CN) .......................... 2017 1 0523517

(51) Int. Cl.
*G02F 1/1333*     (2006.01)
*F21V 8/00*       (2006.01)

(52) U.S. Cl.
CPC ......... *G02B 6/0085* (2013.01); *G02B 6/0055* (2013.01); *G02B 6/0088* (2013.01)

(58) Field of Classification Search
CPC .. G02B 6/0085; G02B 6/0055; G02B 6/0088; G02F 1/1333; G02F 1/133305; G02F 1/133308
See application file for complete search history.

(56) References Cited

U.S. PATENT DOCUMENTS

2012/0162568 A1*  6/2012  Sugawara ......... G02F 1/133308
                                                        349/58
2012/0212974 A1   8/2012  Kim et al.
(Continued)

FOREIGN PATENT DOCUMENTS

CN       104566023 A       4/2015
CN       105511163 A       4/2016
(Continued)

*Primary Examiner* — Anabel Ton
(74) *Attorney, Agent, or Firm* — Mintz Levin Cohn Ferris Glovsky and Popeo, P.C.; Kongsik Kim; Jhongwoo Jay Peck

(57) ABSTRACT

The present disclosure provides a backlight module including a rubber frame, a light guiding plate disposed in the rubber frame, a light strip located on a light incident side of the light guiding plate, an optical film set disposed on a surface of a side of the light guiding plate, and a reflecting sheet disposed on a surface of a side of the light guiding plate deviating from the optical film set. The reflecting sheet is fixed on the rubber frame by a double-faced adhesive, the light strip includes a light strip circuit board, a heat-radiating sheet is disposed on a surface of a side of the light strip circuit board deviating from the light guiding plate, and the heat-radiating sheet includes a fitting portion attached onto the light strip circuit board and a bendable first extension portion extending to an outside of the rubber frame.

16 Claims, 6 Drawing Sheets

(56) References Cited

U.S. PATENT DOCUMENTS

| | | | | |
|---|---|---|---|---|
| 2013/0234921 A1* | 9/2013 | Tang | ................... | G02B 6/0031 |
| | | | | 345/102 |
| 2013/0258713 A1* | 10/2013 | Yu | ....................... | G02B 6/0085 |
| | | | | 362/612 |
| 2014/0016346 A1* | 1/2014 | Hsu | ..................... | H05K 5/0017 |
| | | | | 362/606 |
| 2016/0377908 A1* | 12/2016 | Shin | ................. | G02F 1/133308 |
| | | | | 349/58 |

FOREIGN PATENT DOCUMENTS

| | | |
|---|---|---|
| CN | 206020882 U | 3/2017 |
| CN | 106842696 A | 6/2017 |
| CN | 107102479 A | 8/2017 |

* cited by examiner

BACKLIGHT MODULE AND DISPLAY DEVICE

CROSS-REFERENCES TO RELATED APPLICATIONS

This application is a U.S. national phase application, pursuant to 35 U.S.C. § 371, of PCT/CN2017/100261, filed Sep. 1, 2017, designating the United States, which claims priority to Chinese Application No. 201710523517.2, filed Jun. 30, 2017. The entire contents of the aforementioned patent applications are incorporated herein by this reference.

TECHNICAL FIELD

The present disclosure relates to a liquid crystal display panel technology, and particularly, to a backlight module and a display device.

BACKGROUND ART

At present, intelligent display terminals are increasingly pursuing a high-resolution and high-brightness liquid crystal display module, which undoubtedly needs to use a higher-brightness backlight unit (BLU). Based on a current LED brightness level, a design of the high-brightness backlight unit needs to use more LEDs or adopt a double crystal LED to implement brightness improvement. As the number of LED chips used in a single backlight unit increases, thermal power consumption also increases. How to resolve a problem of LED heat is a subject worthy of study. A heat-radiating structure of the existing backlight module is to add a graphite heat-radiating sheet under a reflecting sheet or a metal back plate which is at the backlight bottom, and a defect thereof is: a thickness of the module increases.

SUMMARY

In order to overcome shortcomings of the prior art, the present disclosure provides a backlight module and a display device, so as to improve heat-radiating effect on the premise of not increasing the thickness of the module.

The present disclosure provides a backlight module including a rubber frame, a light guiding plate disposed in the rubber frame, a light strip located on a light incident side of the light guiding plate, an optical film set disposed on a surface of a side of the light guiding plate, and a reflecting sheet disposed on a surface of a side of the light guiding plate deviating from the optical film set. The reflecting sheet is fixed on the rubber frame by a double-faced adhesive, the light strip includes a light strip circuit board, a heat-radiating sheet is disposed on a surface of a side of the light strip circuit board deviating from the light guiding plate, and the heat-radiating sheet includes a fitting portion attached onto the light strip circuit board and a first extension portion which is bendable, the first extension portion extending to an outside of the rubber frame.

Further, the heat-radiating sheet is a graphite heat-radiating sheet or a graphene thin film.

Further, the heat-radiating sheet further includes a second extension portion extending to a top of the optical film set.

The present disclosure further provides a display device including a display panel, a printed circuit board connected to the display panel, and further including the backlight module.

Further, the first extension portion is attached to a surface of a side of the printed circuit board facing the backlight module.

Further, the heat-radiating sheet further includes a second extension portion extending to a top of the optical film set, and the second extension portion is pasted and fixed with a lower polarizer sheet of the display panel.

Further, the first extension portion bends toward a side of the printed circuit board and covers on a surface of the printed circuit board at a side of the display panel and a control chip of the printed circuit board.

Further, the first extension portion bends toward a surface of a side of the reflecting sheet deviating from the light guiding plate and is attached thereto.

Further, an area of a side of the first extension portion attached to the light guiding plate is equal to an area of a surface of a side of the reflecting sheet deviating from the light guiding plate.

Further, the heat-radiating sheet is a graphite heat-radiating sheet or a graphene thin film.

In comparison with the prior art, in the present disclosure, the heat-radiating sheet is disposed on a surface of a side of the light strip circuit board of the light strip deviating from the light guiding plate and includes the extension portions, and the extension portions may be selectively connected to other heat sources or heat-radiating sources, thereby introducing out heat of the light strip and improving the heat-radiating effect of the backlight module.

DETAILED DESCRIPTION OF EXEMPLARY EMBODIMENTS

The present disclosure is further described in details below in conjunction with the drawings and the embodiments.

Figure 1:
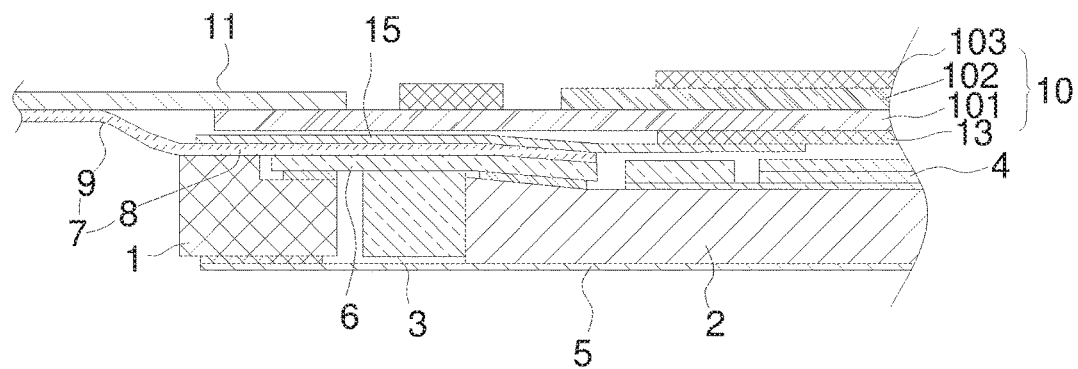
FIG. 1 is a structural schematic diagram of an embodiment 1 of the present disclosure.

As shown in FIG. 1, the backlight module of the present disclosure includes a rubber frame 1, a light guiding plate 2 disposed in the rubber frame 1, a light strip 3 located on a light incident side of the light guiding plate 2, an optical film set 4 disposed on a surface of a side of the light guiding plate 2, and a reflecting sheet 5 disposed on a surface of a side of the light guiding plate 2 deviating from the optical film set 4. The reflecting sheet 5 is fixed on the rubber frame 1 by a double-faced adhesive, the light strip 3 includes a light strip circuit board 6, a light bead of the light strip 3 is opposite to the light incident side of the light guiding plate 2, the light strip circuit board 6 is disposed on the rubber frame 1 and on a surface of a side of the light guiding plate 2 deviating from the reflecting sheet 5, the light strip circuit board 6 is pasted and fixed by the double-faced adhesive, a heat-radiating sheet 7 is disposed on a surface of a side of the light strip circuit board 6 deviating from the light guiding plate 2, and the heat-radiating sheet 7 includes a fitting portion 8 attached onto the light strip circuit board 6 and a first extension portion 9 which is bendable, the first extension portion 9 extending to an outside of the rubber frame 1.

In the backlight module of the present disclosure, the heat-radiating sheet 7 may be a graphite heat-radiating sheet or a graphene thin film. Since a thickness of the heat-radiating sheet 7 is small and the heat-radiating sheet 7 is disposed in a gap of the backlight module, the thickness of the module may not be increased.

Figure 3:
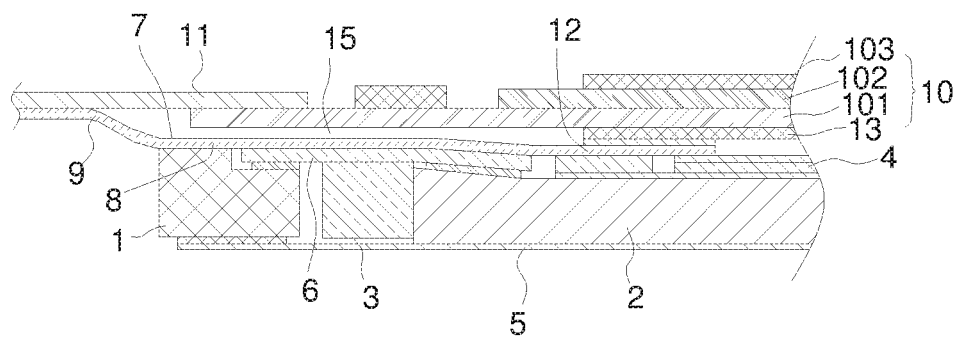
FIG. 3 is a structural schematic diagram of an embodiment 2 of the present disclosure.

As an embodiment of the backlight module of the present disclosure, as shown in FIG. 3, the heat-radiating sheet 7 may further include a second extension portion 12 extending to a top of the optical film set 4. It is worth noting herein that under normal circumstances, the backlight module and the display panel are pasted and fixed by the frame adhesive; furthermore, a width of the frame adhesive located on a side of the light strip is greater than those of other portions; moreover, the width of the frame adhesive may be set to be a same width by disposing the second extension portion 12; and the display panel and the backlight module are fixed by the second extension portion 12, thereby further improving the heat-radiating effect while saving the frame adhesive.

Figure 2:
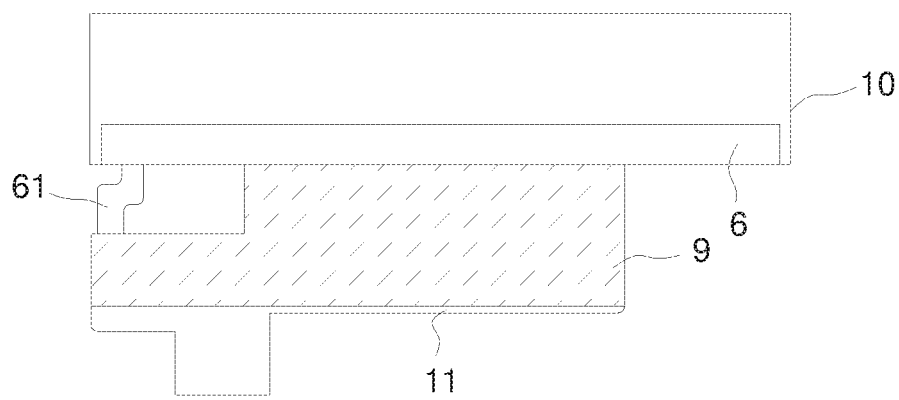
FIG. 2 is an upward view of an embodiment 1 of the present disclosure.

As shown in FIGS. 1 and 2, the display device of the embodiment 1 of the present disclosure includes a display panel 10, a printed circuit board 11 connected to the display panel 10, and the backlight module, the display panel 10 and the backlight module being connected and fixed therebetween by a frame adhesive 15, wherein:

the display panel 10 includes an array substrate 101, a color filter substrate 102 disposed opposite to the array substrate 101, and a liquid crystal encapsulated therebetween (not shown in the figures), a lower polarizer sheet 13 being disposed on the array substrate 101 and an upper polarizer sheet 103 being disposed on the color filter substrate 102;

the backlight module includes the rubber frame 1, the light guiding plate 2 disposed in the rubber frame 1, the light strip 3 located on a light incident side of the light guiding plate 2, the optical film set 4 disposed on a surface of a side of the light guiding plate 2, and a reflecting sheet 5 disposed on a surface of a side of the light guiding plate 2 deviating from the optical film set 4, wherein the reflecting sheet 5 is fixed on the rubber frame 1 by a double-faced adhesive, the light strip 3 includes a light strip circuit board 6, a light bead of the light strip 3 is opposite to the light incident side of the light guiding plate 2, the light strip circuit board 6 is disposed on the rubber frame 1 and on a surface of a side of the light guiding plate 2 deviating from the reflecting sheet 5, the light strip circuit board 6 is pasted and fixed by the double-faced adhesive, a heat-radiating sheet 7 is disposed on a surface of a side of the light strip circuit board 6 deviating from the light guiding plate 2, and the heat-radiating sheet 7 includes the fitting portion 8 attached onto the light strip circuit board 6 and the first extension portion 9 which is bendable, the first extension portion 9 extending to an outside of the rubber frame 1; and the first extension portion 9 is attached along a surface of a side of the printed circuit board 11 facing the light guiding plate 2.

Specifically, a shape and a size of the first extension portion 9 are matched with that of the printed circuit board 11 located at the first extension portion 9.

When the first extension portion 9 is attached to the printed circuit board 11, it is necessary to avoid positions, such as a projecting portion 61 and the like, of the light strip circuit board 6.

In the present embodiment 1, the heat-radiating sheet 7 is a graphite heat-radiating sheet or a graphene thin film, and a thickness thereof is 0.05 to 0.06 mm. Since a thickness of the lower polarizer sheet 13 is normally 0.1 mm, the adopting of the thickness does not affect the attachment of the frame adhesive and the thickness of the backlight module.

Figure 4:
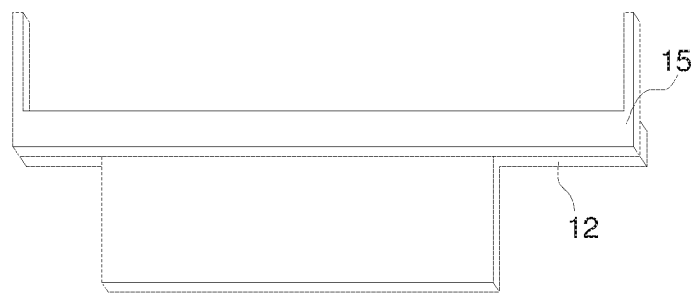
FIG. 4 is a structural schematic diagram of connection of the heat-radiating sheet and a frame adhesive of an embodiment 2 of the present disclosure.

As shown in FIGS. 3 and 4, a display device of an embodiment 2 of the present disclosure includes a display panel 10, a printed circuit board 11 connected to the display panel 10, and the backlight module, the display panel 10 and the backlight module being connected and fixed therebetween by a frame adhesive 15, wherein:

the display panel 10 includes an array substrate 101, a color filter substrate 102 disposed opposite to the array substrate 101, and a liquid crystal encapsulated therebetween (not shown in the figures), a lower polarizer sheet 13 being disposed on the array substrate 101 and an upper polarizer sheet 103 being disposed on the color filter substrate 102;

the backlight module includes a rubber frame 1, a light guiding plate 2 disposed in the rubber frame 1, a light strip 3 located on a light incident side of the light guiding plate 2, an optical film set 4 disposed on a surface of a side of the light guiding plate 2, and a reflecting sheet 5 disposed on a surface of a side of the light guiding plate 2 deviating from the optical film set 4, wherein the reflecting sheet 5 is fixed on the rubber frame 1 by a double-faced adhesive, the light strip 3 includes a light strip circuit board 6, a light bead of the light strip 3 is opposite to the light incident side of the light guiding plate 2, the light strip circuit board 6 is disposed on the rubber frame 1 and on a surface of a side of the light guiding plate 2 deviating from the reflecting sheet 5, the light strip circuit board 6 is pasted and fixed by the double-faced adhesive, a heat-radiating sheet 7 is disposed on a surface of a side of the light strip circuit board 6 deviating from the light guiding plate 2, and the heat-radiating sheet 7 includes a fitting portion 8 attached onto the light strip circuit board 6 and a first extension portion 9 which is bendable, the first extension portion 9 extending to an outside of the rubber frame 1;

the first extension portion 9 is attached along a surface of the printed circuit board 11 facing the light guiding plate 2; and the heat-radiating sheet 7 further includes a second extension portion 12 extending to a top of the optical film set 4, and the second extension portion 12 is pasted and fixed with the lower polarizer sheet 13 of the display panel 10; specifically, a shape and a size of the first extension portion 9 are matched with that of the printed circuit board 11 located at the first extension portion 9; and the frame adhesive 15 has a uniform width all round, and the second extension portion 12 is pasted and fixed with the lower polarizer sheet 13 by the frame adhesive 15.

When the first extension portion 9 is attached to the printed circuit board 11, it is necessary to avoid positions, such as a projecting portion 61, and the like, of the light strip circuit board 6.

In the present embodiment 2, the heat-radiating sheet 7 is a graphite heat-radiating sheet or a graphene thin film.

As shown in FIG. 4, in the embodiment 2, a position of the frame adhesive 15 at a side of the light strip is located at a position where the second extension portion 12 is opposite to the lower polarizer sheet 13, so as to avoid the increase in the width of the frame adhesive 15 in the portion traditionally, thereby covering the light strip circuit board 6 and reducing an amount of the frame adhesive 15.

Figure 5:
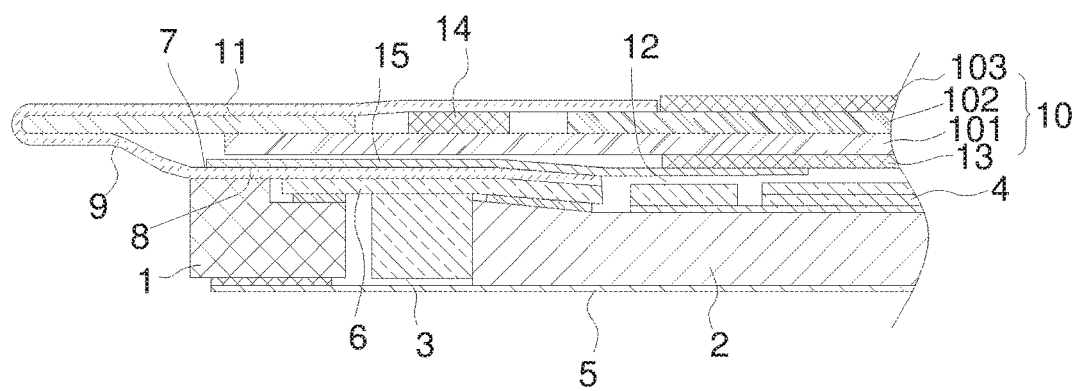
FIG. 5 is a structural schematic diagram of an embodiment 3 of the present disclosure.

As shown in FIG. 5, the display device of an embodiment 3 of the present disclosure includes a display panel 10, a printed circuit board 11 connected to the display panel 10, and the backlight module, the display panel 10 and the backlight module being connected and fixed therebetween by a "☐" adhesive 15, wherein:

the display panel 10 includes an array substrate 101, a color filter substrate 102 disposed opposite to the array substrate 101, and a liquid crystal encapsulated therebetween (not shown in the figures), a lower polarizer sheet 13 being disposed on the array substrate 101 and an upper polarizer sheet 103 being disposed on the color filter substrate 102;

the backlight module includes a rubber frame 1, a light guiding plate 2 disposed in the rubber frame 1, a light strip 3 located on a light incident side of the light guiding plate 2, an optical film set 4 disposed on a surface of a side of the light guiding plate 2, and a reflecting sheet 5 disposed on a surface of a side of the light guiding plate 2 deviating from the optical film set 4, wherein the reflecting sheet 5 is fixed on the rubber frame 1 by a double-faced adhesive, the light strip 3 includes a light strip circuit board 6, a light bead of the light strip 3 is opposite to the light incident side of the light guiding plate 2, the light strip circuit board 6 is disposed on the rubber frame 1 and on a surface of a side of the light guiding plate 2 deviating from the reflecting sheet 5, the light strip circuit board 6 is pasted and fixed by the double-faced adhesive, a heat-radiating sheet 7 is disposed on a surface of a side of the light strip circuit board 6 deviating from the light guiding plate 2, and the heat-radiating sheet 7 includes a fitting portion 8 attached onto the light strip circuit board 6 and a first extension portion 9 which is bendable, the first extension portion 9 extending to an outside of the rubber frame 1; and the first extension portion 9 bends toward a side of the printed circuit board 11 and covers on a surface of the printed circuit board 11 at a side of the display panel 10 and a control chip 14 of the printed circuit board 11, and specifically, the bending manner may be set according to a specific shape of the printed circuit board 11 and may not be specifically limited herein, and it is only necessary to make the first extension portion 9 bend and cover on the printed circuit board 11 and the control chip 14.

In the embodiment 3, an end portion of the first extension portion 9 may be placed on an edge of the color filter substrate 102.

In the present embodiment 3, the heat-radiating sheet 7 is a graphite heat-radiating sheet or a graphene thin film. Since the graphite heat-radiating sheet and the graphene thin film have good flexibility, the bending of the printed circuit board 11 may not be affected, and specifically, the heat-radiating sheet 7 is the graphene thin film.

Figure 6:
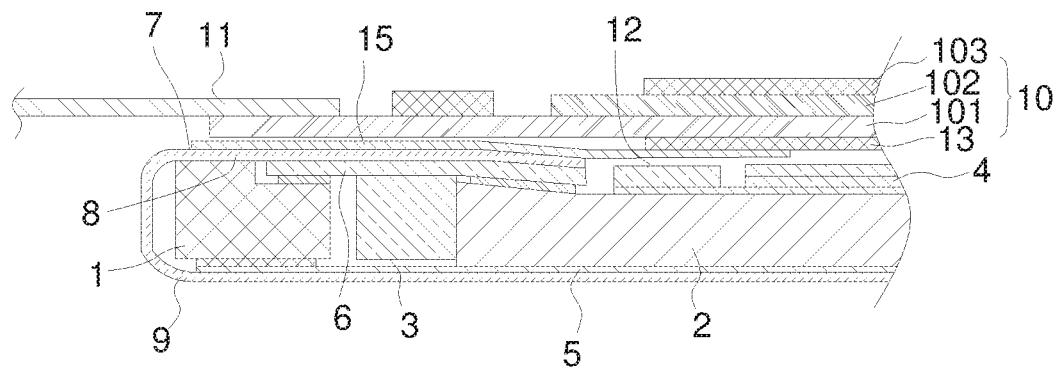
FIG. 6 is a structural schematic diagram of an embodiment 4 of the present disclosure.

As shown in FIG. 6, the display device of the embodiment 4 of the present disclosure includes a display panel 10, a printed circuit board 11 connected to the display panel 10, and the backlight module, the display panel 10 and the backlight module being connected and fixed therebetween by a frame adhesive 15, wherein:

the display panel 10 includes an array substrate 101, a color filter substrate 102 disposed opposite to the array substrate 101, and a liquid crystal encapsulated therebetween (not shown in the figures), a lower polarizer sheet 13 being disposed on the array substrate 101 and an upper polarizer sheet 103 being disposed on the color filter substrate 102;

the backlight module includes a rubber frame 1, a light guiding plate 2 disposed in the rubber frame 1, a light strip 3 located on a light incident side of the light guiding plate 2, an optical film set 4 disposed on a surface of a side of the light guiding plate 2, and a reflecting sheet 5 disposed on a surface of a side of the light guiding plate 2 deviating from the optical film set 4, wherein the reflecting sheet 5 is fixed on the rubber frame 1 by a double-faced adhesive, the light strip 3 includes a light strip circuit board 6, a light bead of the light strip 3 is opposite to the light incident side of the light guiding plate 2, the light strip circuit board 6 is disposed on the rubber frame 1 and on a surface of a side of the light guiding plate 2 deviating from the reflecting sheet 5, the light strip circuit board 6 is pasted and fixed by the double-faced adhesive, a heat-radiating sheet 7 is disposed on a surface of a side of the light strip circuit board 6 deviating from the light guiding plate 2, and the heat-radiating sheet 7 includes a fitting portion 8 attached onto the light strip circuit board 6 and a first extension portion 9 which is bendable, the first extension portion 9 extending to an outside of the rubber frame 1; and the first extension portion 9 bends toward a surface of a side of the reflecting sheet 5 deviating from the light guiding plate 2 and is attached thereto, and specifically, an area of a side of the first extension portion 9 attached to the light guiding plate 2 is equal to an area of a surface of a side of the reflecting sheet 5 deviating from the light guiding plate 2.

Embodiment 4 may enable heat distribution of a heat source position to be even, enhance the heat-radiating effect, and increase an area of heat radiation and an effect of convection.

In the present embodiment 4, the heat-radiating sheet 7 is a graphite heat-radiating sheet or a graphene thin film.

In the present disclosure, the bending position and other positions, which are not in contact with components, of the heat-radiating sheet 7 may further be edge wrapped by a PET (polyethylene terephthalate) including a single-faced adhesive.

The present disclosure transfers heat of the heat source to other components by the heat-radiating sheet, balances temperature distribution of the heat source, enhances radiation and convection of the heat, prevents a problem of a local temperature of the backlight module being excessively high, and may also produce an effect of electromagnetic shielding.

Although the present disclosure is illustrated and described with reference to the specific embodiments, those skilled in the art will understand that: various changes in forms and details may be made therein without departing from the spirit and the scope of the present disclosure as defined by the claims and the equivalents thereof.

What is claimed is:

1. A backlight module comprising:
   a rubber frame;
   a light guiding plate disposed in the rubber frame;
   a light strip located on a light incident side of the light guiding plate;
   an optical film set disposed on a top surface of the light guiding plate;
   a reflecting sheet disposed on a bottom surface of the light guiding plate away from the optical film set, wherein the reflecting sheet is fixed on the rubber frame by a double-faced adhesive;
   a light strip circuit board disposed on the light strip; and a heat-radiating sheet disposed on top surface of the light strip circuit board away from the light guiding plate, wherein the heat-radiating sheet comprises a fitting portion attached onto the light strip circuit board and a first extension portion which is bendable, the first extension portion extending to an outside of the rubber frame.

2. The backlight module of claim 1, wherein the heat-radiating sheet is a graphite heat-radiating sheet or a graphene thin film.

3. The backlight module of claim 1, wherein the heat-radiating sheet further comprises a second extension portion extending to a top of the optical film set.

4. The backlight module of claim 2, wherein the heat-radiating sheet further comprises a second extension portion extending to a top of the optical film set.

5. A display device comprising a display panel and a printed circuit board connected to the display panel, wherein the display device further comprises a backlight module comprising:
- a rubber frame;
- a light guiding plate disposed in the rubber frame;
- a light strip located on a light incident side of the light guiding plate;
- an optical film set disposed on a top surface of the light guiding plate;
- a reflecting sheet disposed on a bottom surface of the light guiding plate away from the optical film set, wherein the reflecting sheet is fixed on the rubber frame by a double-faced adhesive;
- a light strip circuit board disposed on the light strip; and
- a heat-radiating sheet disposed on a top surface of the light strip circuit board away from the light guiding plate, wherein the heat-radiating sheet comprises a fitting portion attached onto the light strip circuit board and a first extension portion which is bendable, the first extension portion extending to an outside of the rubber frame.

6. The display device of claim 5, wherein the first extension portion is attached to a bottom surface of the printed circuit board that faces the backlight module.

7. The display device of claim 6, wherein the heat-radiating sheet further comprises a second extension portion extending to a top of the optical film set, and the second extension portion is pasted and fixed with a lower polarizer sheet of the display panel.

8. The display device of claim 5, wherein the first extension portion bends toward the printed circuit board and covers on a bottom surface of the printed circuit board at a side of the display panel and a control chip of the printed circuit board.

9. The display device of claim 5, wherein the first extension portion bends toward a bottom surface of the reflecting sheet away from the light guiding plate and is attached thereto.

10. The display device of claim 9, wherein an area of the first extension portion attached to the light guiding plate is equal to an area of the reflecting sheet away from the light guiding plate.

11. The display device of claim 5, wherein the heat-radiating sheet is a graphite heat-radiating sheet or a graphene thin film.

12. The display device of claim 6, wherein the heat-radiating sheet is a graphite heat-radiating sheet or a graphene thin film.

13. The display device of claim 7, wherein the heat-radiating sheet is a graphite heat-radiating sheet or a graphene thin film.

14. The display device of claim 8, wherein the heat-radiating sheet is a graphite heat-radiating sheet or a graphene thin film.

15. The display device of claim 9, wherein the heat-radiating sheet is a graphite heat-radiating sheet or a graphene thin film.

16. The display device of claim 10, wherein the heat-radiating sheet is a graphite heat-radiating sheet or a graphene thin film.

* * * * *